United States Patent
Kinoshita et al.

(10) Patent No.: US 11,455,004 B2
(45) Date of Patent: Sep. 27, 2022

(54) PORTABLE INFORMATION DEVICE

(71) Applicant: Lenovo (Singapore) Pte. Ltd., Singapore (SG)

(72) Inventors: Hiroaki Kinoshita, Kanagawa (JP); Takehito Yamauchi, Kanagawa (JP); Shigehiro Horiuchi, Kanagawa (JP); Tatsuya Ushioda, Kanagawa (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 107 days.

(21) Appl. No.: 17/083,862

(22) Filed: Oct. 29, 2020

(65) Prior Publication Data
US 2021/0365066 A1 Nov. 25, 2021

(30) Foreign Application Priority Data
May 21, 2020 (JP) .............................. JP2020-089121

(51) Int. Cl.
*G06F 1/16* (2006.01)
(52) U.S. Cl.
CPC .......... *G06F 1/1616* (2013.01); *G06F 1/1679* (2013.01); *G06F 1/1681* (2013.01)
(58) Field of Classification Search
CPC ..... G06F 1/1616; G06F 1/1681; G06F 1/1679
See application file for complete search history.

(56) References Cited

U.S. PATENT DOCUMENTS

| | | | | |
|---|---|---|---|---|
| 9,506,279 | B2* | 11/2016 | Kauhaniemi | H04M 1/0216 |
| 10,073,496 | B2* | 9/2018 | Chen | G06F 1/1681 |
| 10,390,444 | B2* | 8/2019 | Choi | G06F 1/1652 |
| 10,558,242 | B2* | 2/2020 | Kim | G06F 1/1681 |
| 11,076,499 | B2* | 7/2021 | Jeon | H05K 5/0017 |
| 2016/0370828 | A1* | 12/2016 | Hsu | G06F 1/1652 |
| 2018/0067519 | A1* | 3/2018 | Tazbaz | E05D 11/10 |
| 2018/0088634 | A1* | 3/2018 | Bitz | E05D 3/06 |

FOREIGN PATENT DOCUMENTS

JP 6429909 B2 11/2018

* cited by examiner

*Primary Examiner* — Rockshana D Chowdhury
(74) *Attorney, Agent, or Firm* — Osha Bergman Watanabe & Burton LLP

(57) ABSTRACT

A portable information device includes: a first chassis; a second chassis disposed adjacently to the first chassis and coupled to the first chassis to be rotatable between a flat form and a stacked form; and a spine member disposed across adjacent end portions of the first and second chassis. In the flat form, the first and second chassis are side by side in a direction perpendicular to a surface direction of the first and second chassis. In the stacked form, the first and second chassis are stacked and overlap one another in the surface direction.

8 Claims, 13 Drawing Sheets

PORTABLE INFORMATION DEVICE

TECHNICAL FIELD

The present invention relates to a portable information device in which left and right chassis thereof are rotatably coupled to each other.

BACKGROUND

The Applicant has proposed a portable information device in which left and right chassis thereof are rotatably coupled to each other in Japanese Patent Publication No. 6429909, for example. This portable information device includes a spine member for hiding a gap that appears between the left and right chassis when they are rotated to be folded.

The device disclosed in Japanese Patent Publication No. 6429909 includes a spine member that forms an arch shape like a backbone when the left and right chassis are folded, which ensures rigidity between the both chassis. When the spine member in the Japanese Patent Publication No. 6429909 is in the arch shape, frame members (support members and reinforcing members) abut on each other to serve as a post supporting the chassis. The frame members are made of a hard resin, for example. As such, when an external force is applied to the folded chassis, side surfaces abutting on each other to form the arch shape may be moved relative to each other. This relative movements of the frame members make it impossible for the spine member to function as a sufficiently rigid post, which may result in that the external force affects electronic components such as a display.

SUMMARY

One or more embodiments of the present invention provide a portable information device capable of maintaining the rigidity of the spine member when the left and right chassis are stacked.

A portable information device according to one or more embodiments of the present invention is a portable information device including: a first chassis; a second chassis provided adjacently to the first chassis, the second chassis being coupled to the first chassis so as to be relatively rotatable between a flat form in which the first and second chassis are arranged side by side in a direction perpendicular to a surface direction thereof and a stacked form in which the first and second chassis are stacked to overlap each other in the surface direction thereof; and a spine member provided across adjacent end portions of the first and second chassis, the spine member covering a gap generated between the adjacent end portions of the first and second chassis in the stacked form, the spine member including: a plurality of adjacent post members that are so arranged that facing side surfaces thereof are relatively rotatable, three or more of the post members being provided along a direction in which the first and second chassis are arranged side by side; and a misalignment preventing portion provided between the facing side surfaces of the post members, the misalignment preventing portion suppressing a relative movement between the facing side surfaces when they abut on each other, wherein, in the stacked form, the facing side surfaces of the plurality of post members abut on each other via the misalignment preventing portion, and the post members are successive between the first and second chassis to cover the gap.

The spine member may further include a flexible sheet member, bottom sides of the plurality of post members being fixed to a front side of the sheet member using a gluing agent, and the plurality of post members may have a cut portion at a corner between the facing side surfaces and the bottom sides.

The portable information device may further include: a display extending across the first and second chassis and including a bending region at least in an area across the adjacent end portions; a first plate provided on an inner surface of the first chassis, the first plate supporting an area of the display on the first chassis side; a second plate provided on an inner surface of the second chassis so as to be adjacent to the first plate, the second plate supporting an area of the display on the second chassis side; and a locking piece protruding from one or both of a backside of the first plate and a backside of the second plate toward the other or both of the first plate and the second plate to contact a backside thereof, a distal end of the locking piece protruding beyond adjacent end surfaces of the first plate and the second plate that are arranged side by side in a direction perpendicular to a surface direction thereof in the flat form, wherein the spine member may further include a relief portion formed by recessing front sides of the post members, and the relief portion may be provided at a position corresponding to the locking piece.

The misalignment preventing portion may be configured by a protrusion provided on one of the facing side surfaces and a locking hole provided on the other of the facing side surfaces, the protrusion being engageable with the locking hole.

The protrusion may be formed in a truncated cone shape or a truncated pyramid shape.

The misalignment preventing portion may include a friction resistance imparting portion provided on one or both of the facing side surfaces and increasing sliding resistance between the facing side surfaces.

The misalignment preventing portion may be provided each between the facing side surfaces of the plurality of post members.

In the flat form, the facing side surfaces of the plurality of post members may be separated from each other or may abut on each other in smaller areas than those in the stacked form.

A portable information device according to one or more embodiments of the present invention is a portable information device including: a first chassis; a second chassis provided adjacently to the first chassis, the second chassis being coupled to the first chassis so as to be relatively rotatable between a flat form in which the first and second chassis are arranged side by side in a direction perpendicular to a surface direction thereof and a stacked form in which the first and second chassis are stacked to overlap each other in the surface direction thereof; and a spine member provided across adjacent end portions of the first and second chassis, the spine member covering a gap generated between the adjacent end portions of the first and second chassis in the stacked form, the spine member including: a plurality of adjacent post members that are so arranged that facing side surfaces thereof are relatively rotatable, three or more of the post members being provided along a direction in which the first and second chassis are arranged side by side; and a flexible sheet member, bottom sides of the plurality of post members being fixed to a front side of the sheet member using a gluing agent, wherein, in the stacked form, the facing side surfaces of the plurality of post members abut on each other, the post members are successive between the first and second chassis to cover the gap, and the plurality of post members have a cut portion at a corner between the facing side surfaces and the bottom sides.

The above embodiments of the present invention make it possible to maintain the rigidity of the spine member when the left and right chassis are stacked.

DETAILED DESCRIPTION

In the following, a portable information device according to one or more embodiments of the present invention will be described in detail with reference to accompanying drawings.

Figure 1:
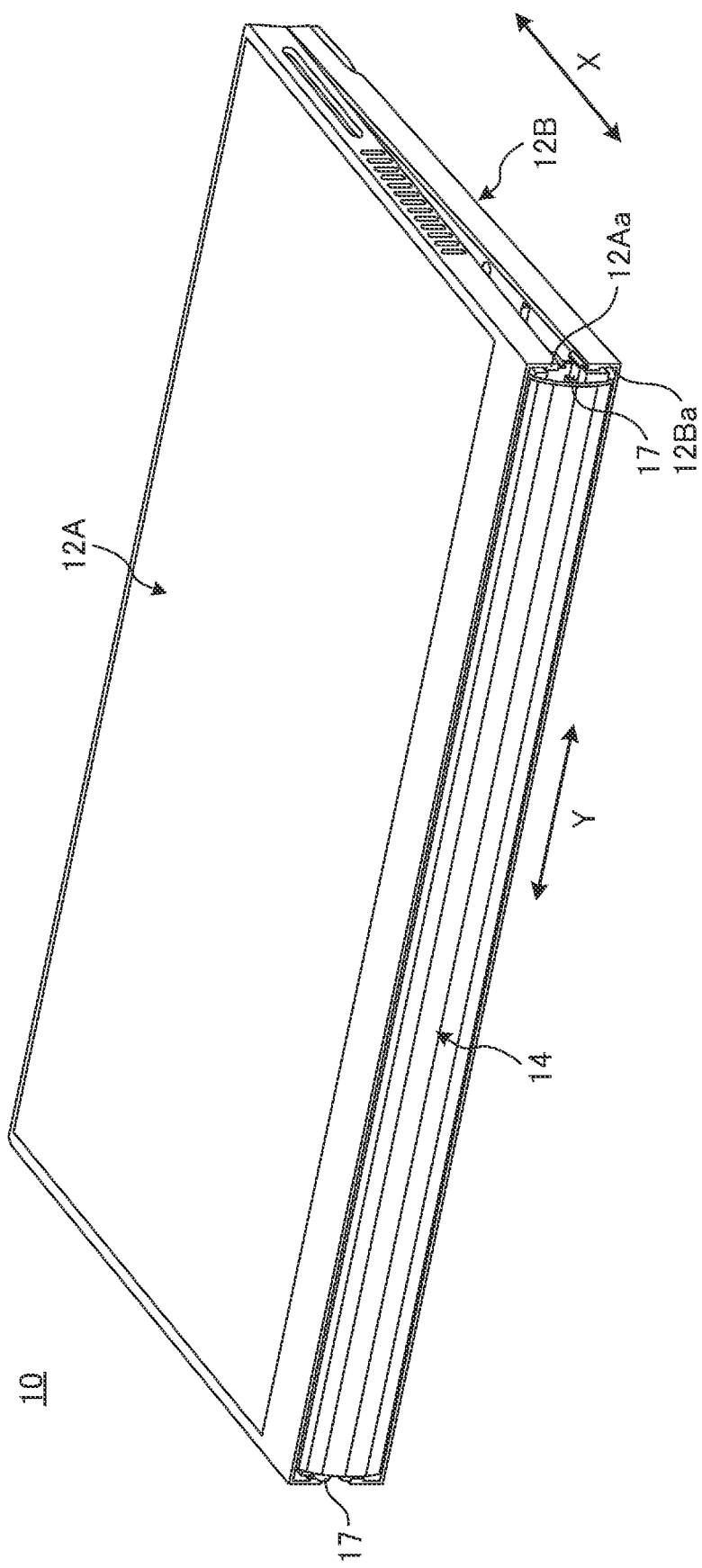
FIG. 1 is a perspective view illustrating a portable information device according to one or more embodiments that has been closed into a stacked form.
Figure 2:
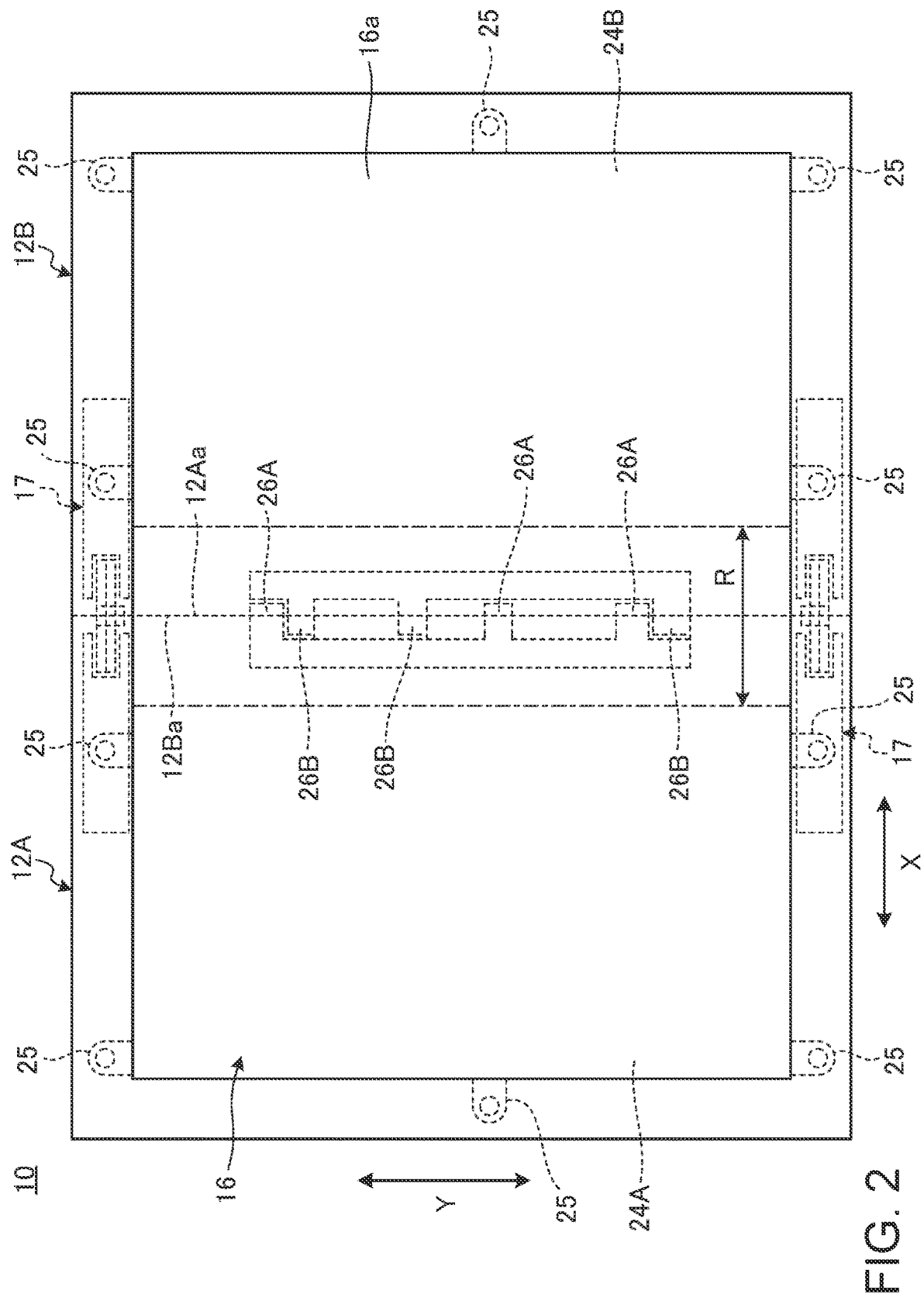
FIG. 2 is a schematic plan view of the portable information device illustrated in FIG. 1 that has been opened into a flat form.
Figure 3:
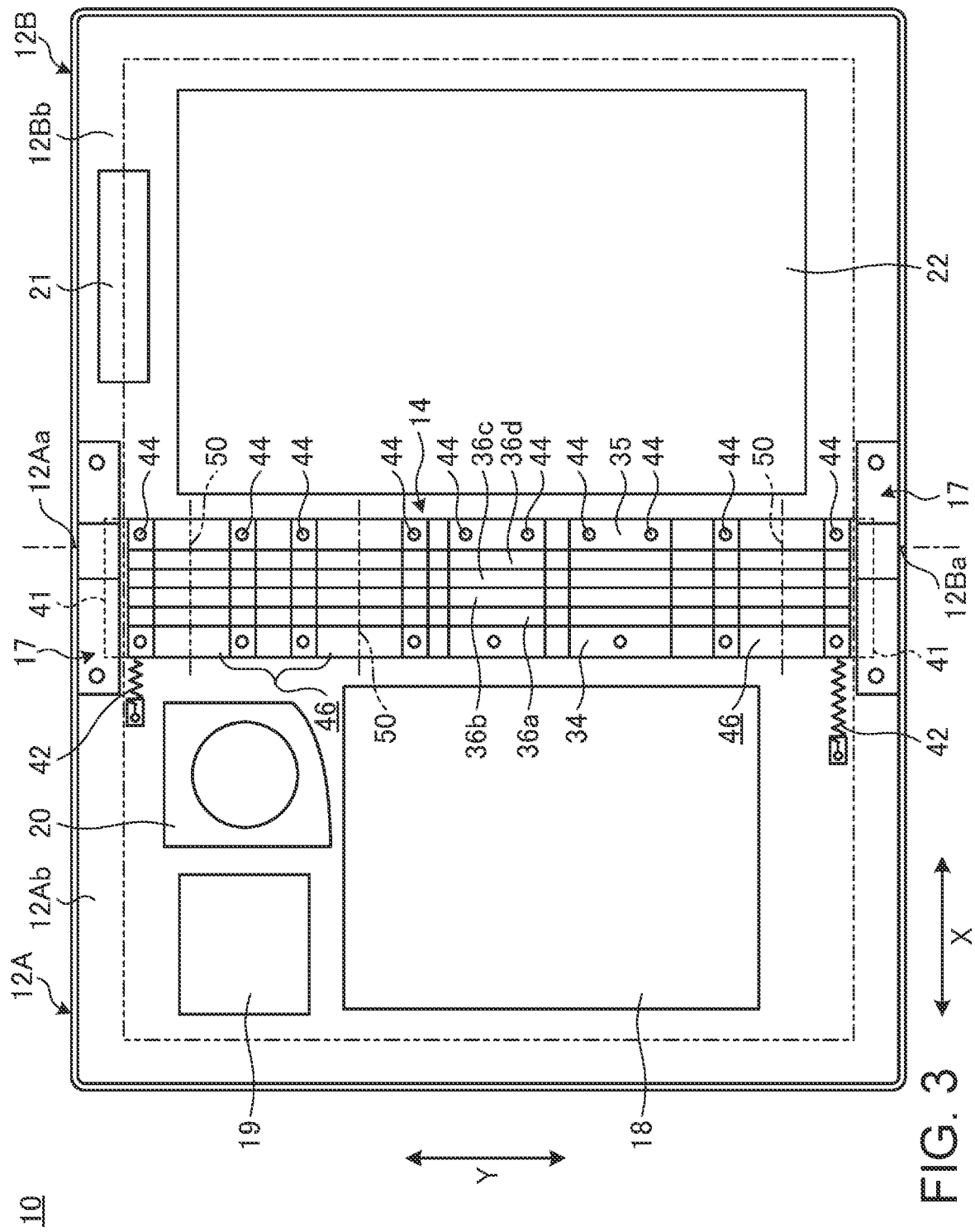
FIG. 3 is a plan view schematically illustrating an internal structure of the portable information device illustrated in FIG. 2.

FIG. 1 is a perspective view illustrating a portable information device 10 according to one or more embodiments that has been closed into a stacked form. FIG. 2 is a schematic plan view of the portable information device 10 illustrated in FIG. 1 that has been opened into a flat form. FIG. 3 is a plan view schematically illustrating an internal structure of the portable information device 10 illustrated in FIG. 2.

As illustrated in FIGS. 1 to 3, the portable information device 10 includes a first chassis 12A, a second chassis 12B, a spine member 14, and a display 16. The portable information device 10 of one or more embodiments is a tablet PC that is foldable into a double-folded state like a folio. The portable information device 10 may alternatively be a mobile phone, a smartphone, an electronic notebook, a portable game machine or the like.

The chassis 12A and 12B are disposed adjacently to each other. Each of the chassis 12A and 12B is formed of a rectangular plate member having a side wall that is erected from three sides thereof except for a side corresponding to the spine member 14 (adjacent end portions 12Aa or 12Ba), for example. Each of the chassis 12A and 12B is formed of a metal plate of stainless steel, magnesium, aluminum or the like or a fiber-reinforced resin plate containing reinforced fibers such as carbon fibers.

In the following description of the portable information device 10, as illustrated in FIGS. 1 to 3, a direction in which the chassis 12A and 12b are arranged side by side, i.e., a transverse direction (width direction) of the spine member 14 is referred to as an X direction, and a direction that is orthogonal to the X direction and extends along the adjacent end portions 12Aa and 12Ba, i.e., a longitudinal direction of the spine member 14 is referred to as a Y direction.

The chassis 12A and 12B are coupled to each other by a pair of hinges 17 at the adjacent end portions 12Aa and 12Ba. The hinges 17 allow the chassis 12A and 12B to be relatively rotated between a stacked form illustrated in FIG. 1 and a flat form illustrated in FIG. 2. The hinges 17 are respectively disposed at both ends in the Y direction of the adjacent end portions 12Aa and 12Ba of the chassis 12A and 12B and are thus located outside the outer peripheral edge portion of the display 16. In the portable information device 10 of one or more embodiments, a rotation center of the chassis 12A and 12B defined by the hinges 17 coincides with a front side 16a of the display 16.

Figure 4A:
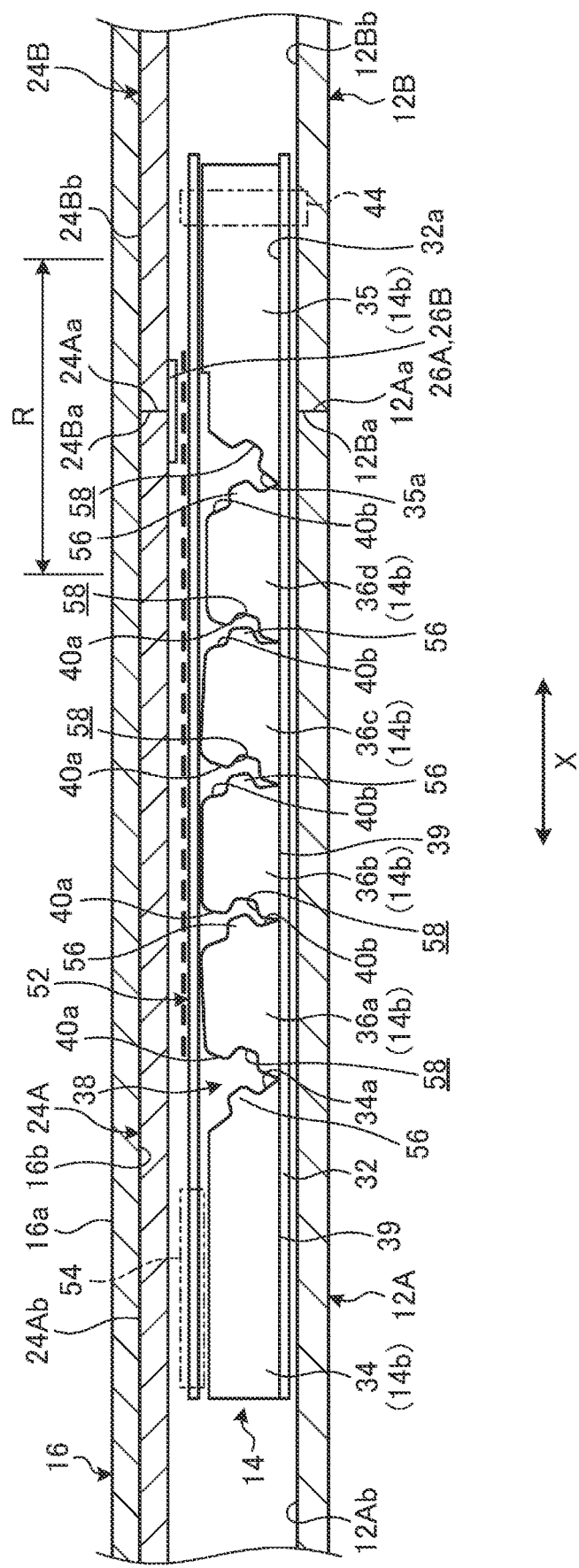
FIG. 4A is a side cross-sectional view schematically illustrating an internal structure of the portable information device in the flat form.

In the flat form, the chassis 12A and 12B are arranged side by side in the X direction perpendicular to a surface direction thereof and the adjacent end portions 12Aa and 12Ba are in contact with each other (see FIGS. 2 and 4A). In the stacked form, the chassis 12A and 12B are stacked to overlap each other in the surface direction thereof and the adjacent end portions 12Aa and 12Ba are separated to form a big gap therebetween (see FIG. 4B).

As illustrated in FIG. 3, a motherboard 18, a communication module 19, a cooling fan 20, and others are fixed to an inner surface 12Ab of the first chassis 12A using a screw or the like. An antenna 21, a battery unit 22, and others are fixed to an inner surface 12Bb of the second chassis 12B using a screw or the like. The motherboard 18 is an electronic substrate for controlling the portable information device 10 in general, and unillustrated various electronic components such as a central processing unit (CPU) and a memory are mounted thereon. The communication module 19 is a device which processes information transmitted and received by an antenna 21 via various wireless communications such as wireless local area network (WLAN) or wireless wide area network (WWAN). The antenna 21 is usually provided in plurality. The cooling fan 20 is a device for cooling the CPU and others mounted on the motherboard 18. The battery unit 22 is a power supply for the portable information device 10 and can be charged from an external power source via an unillustrated power cable. Electronic components other than the above may be mounted in the chassis 12A and 12B.

Figure 4B:
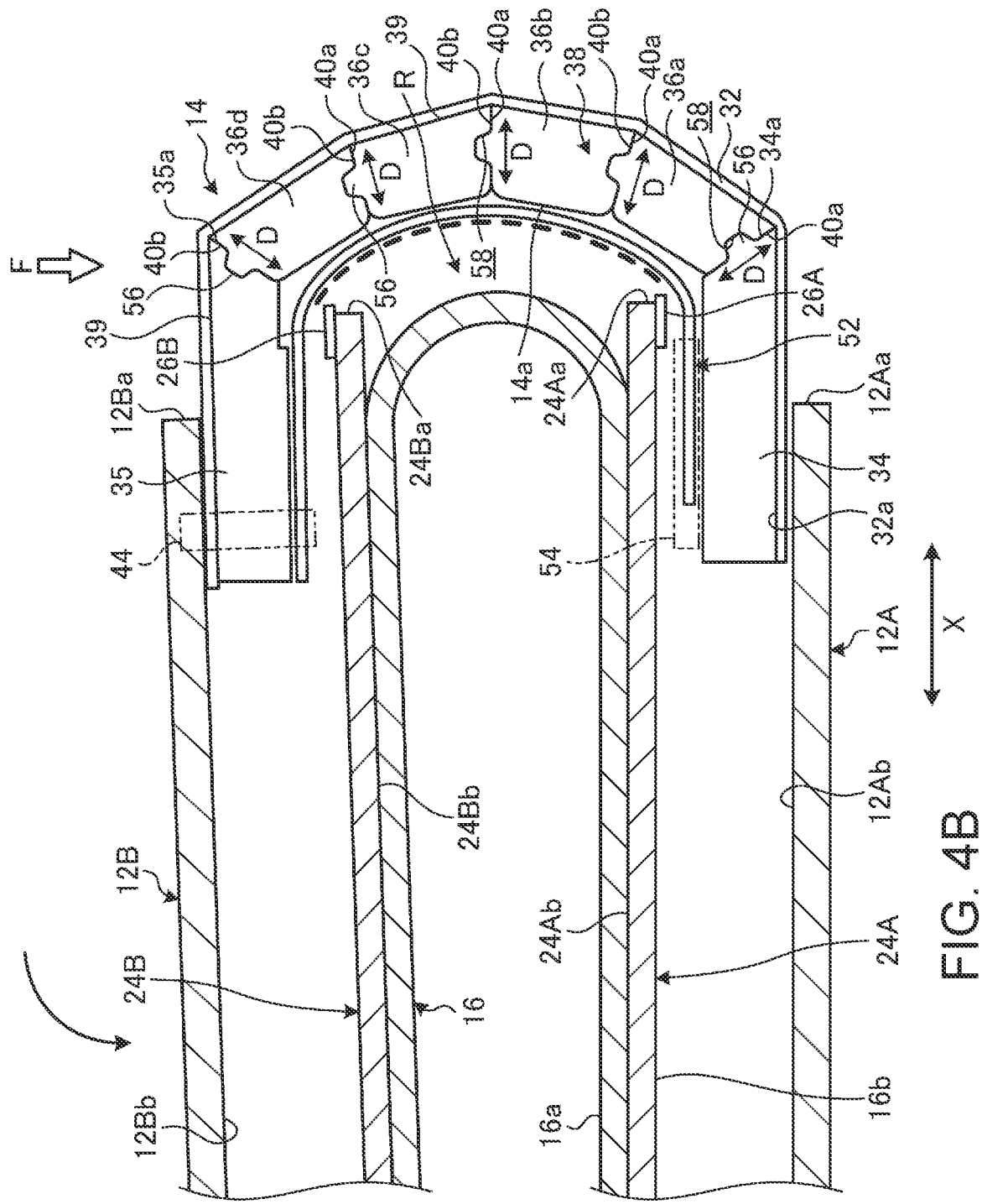
FIG. 4B is a side cross-sectional view of the portable information device illustrated in FIG. 4A in the stacked form.

FIG. 4A is a side cross-sectional view schematically illustrating an internal structure of the portable information device 10 in the flat form. FIG. 4B is a side cross-sectional view of the portable information device 10 illustrated in FIG. 4A in the stacked form. FIGS. 4A and 4B illustrate, in an enlarged manner, the adjacent end portions 12Aa and 12Ba of the left and right chassis 12A and 12B as well as the periphery thereof.

As illustrated in FIGS. 3 to 4B, the display 16 extends across the chassis 12A and 12B. The display 16 is a touch panel type liquid crystal display, for example. The display 16 is a flexible display such as an organic EL having a paper structure with high flexibility. As illustrated in FIGS. 4A and 4B, the display 16 is supported by a first plate 24A and a second plate 24B and extends across these plates 24A and 24B.

The first plate 24A is disposed to cover a top opening of the first chassis 12A. The second plate 24B is disposed to cover a top opening of the second chassis 12B. The plates 24A and 24B are arranged adjacently to each other. The plates 24A and 24B support the display 16 on front sides 24Ab and 24Bb thereof. A back side 16b of the display 16 is stuck onto the front sides 24Ab and 24Bb of the plates 24A and 24B using an adhesive such as a double-sided tape. Each of the plates 24A and 24B is a thin and hard plate-like member. Each of the plates 24A and 24B of one or more embodiments is a fiber-reinforced resin plate produced by impregnating reinforced fibers such as carbon fibers in a matrix resin such as an epoxy resin. Each of the plates 24A and 24B may be a metal plate of stainless steel or the like.

Each of the plates 24A and 24B is provided with a plurality of attachment pieces 25 that are projected from three outer peripheral end surfaces other than the adjacent end surfaces 24Aa and 24Ba (see FIG. 2). The attachment pieces 25 are respectively screwed to boss portions (not illustrated) erecting from the inner surfaces of the chassis 12A and 12B, for example. The display 16 is relatively fixed to the chassis 12A and 12B via the plates 24A and 24B. This causes the plates 24A and 24B to be rotated integrally with the chassis 12A and 12B, which results in opening and closing the display 16. The plates 24A and 24B may be fixed to the chassis by screwing back sides thereof directly to the boss portion or the like instead of screwing a part or all of the attachment pieces 25.

In the flat form illustrated in FIG. 4A, the plates 24A and 24B are arranged adjacently to each other in a direction perpendicular to the surface direction thereof so that the adjacent end surfaces 24Aa and 24Ba are in contact with each other. Here, the display 16 serves as a large screen opened into a flat shape. In the stacked form illustrated in FIG. 4B, the adjacent end surfaces 24Aa and 24Ba of the plates 24A and 24B are separated from each other. Here, the display 16 is folded into a substantial U-shape.

As illustrated in FIGS. 2, 4A, and 4B, the display 16 includes a bending region R in an area across the adjacent end surfaces 24Aa and 24Ba of the plates 24A and 24B. The bending region R, which is a belt-like region that is shorter in the X direction and longer in the Y direction, is provided to bridge the adjacent end portions 12Aa and 12Ba of the chassis 12A and 12B. It is the bending region R that is bent when the chassis 12A and 12B change from the flat form into the stacked form. The display 16 may be flexible only in the bending region R.

An area of the back side 16b of the display 16 other than the bending region R is fixed to the front side 24Ab of the first plate 24A. An area of the back side 16b of the display 16 other than the bending region R is fixed to the front side 24Bb of the second plate 24B. For the fixation of the back side 16b of the display 16 to the front sides 24Ab and 24Bb, an adhesive such as a double-sided tape is used, for example.

The bending region R, which is not fixed to the plates 24A and 24B, is movable relative to the front sides 24Ab and 24Bb.

Each of the plates 24A and 24B is provided with a locking claw 26A and 26B on the back sides thereof. A distal end of the locking claw 26A provided on the back side of the first plate 24A protrudes beyond the adjacent end surfaces 24Aa and 24Ba to contact the back side of the second plate 24B. A distal end of the locking claw 26B provided on the back side of the second plate 24B protrudes beyond the adjacent end surfaces 24Ba and 24Aa to contact the back side of the first plate 24A. There may be one locking claw 26A and one locking claw 26B. In one or more embodiments, the locking claws 26A and 26B are each provided in plurality (three), and they are arranged in parallel (see FIG. 2). For example, the three locking claws 26A and 26B each are aligned along a side of a plate. In the flat form illustrated in FIG. 4A, upper surfaces of tips of the locking claws 26A and 26B are respectively in contact with the back sides of the plates 24B and 24A to suppress a level difference between the plates 24A and 24B. This allows an extremely flat plane to be formed and maintained by the front sides 24Ab and 24Bb of the plates 24A and 24B. The locking claws 26A and 26B may be omitted.

Figure 5:
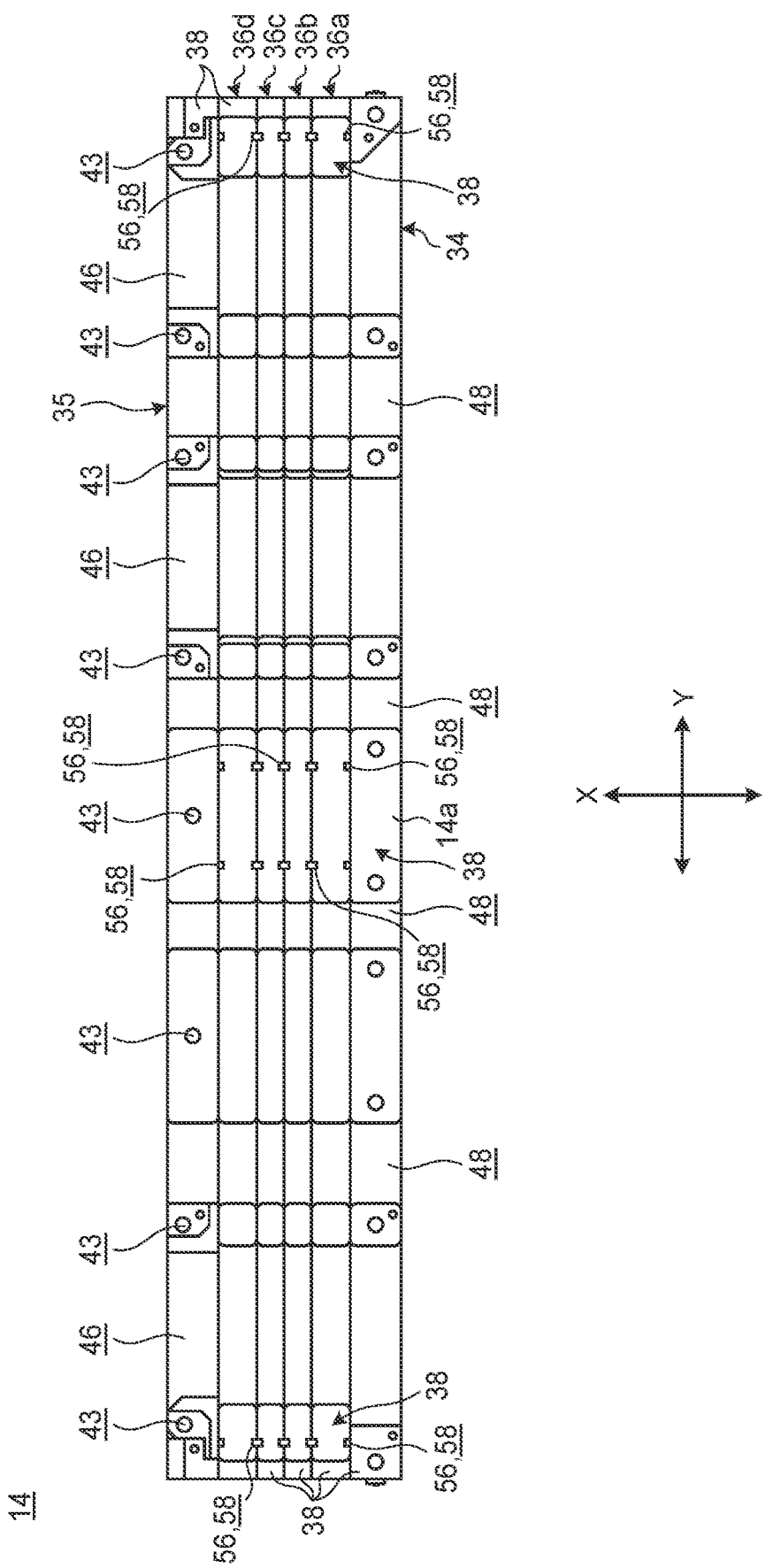
FIG. 5 is a plan view of a spine member.
Figure 6:
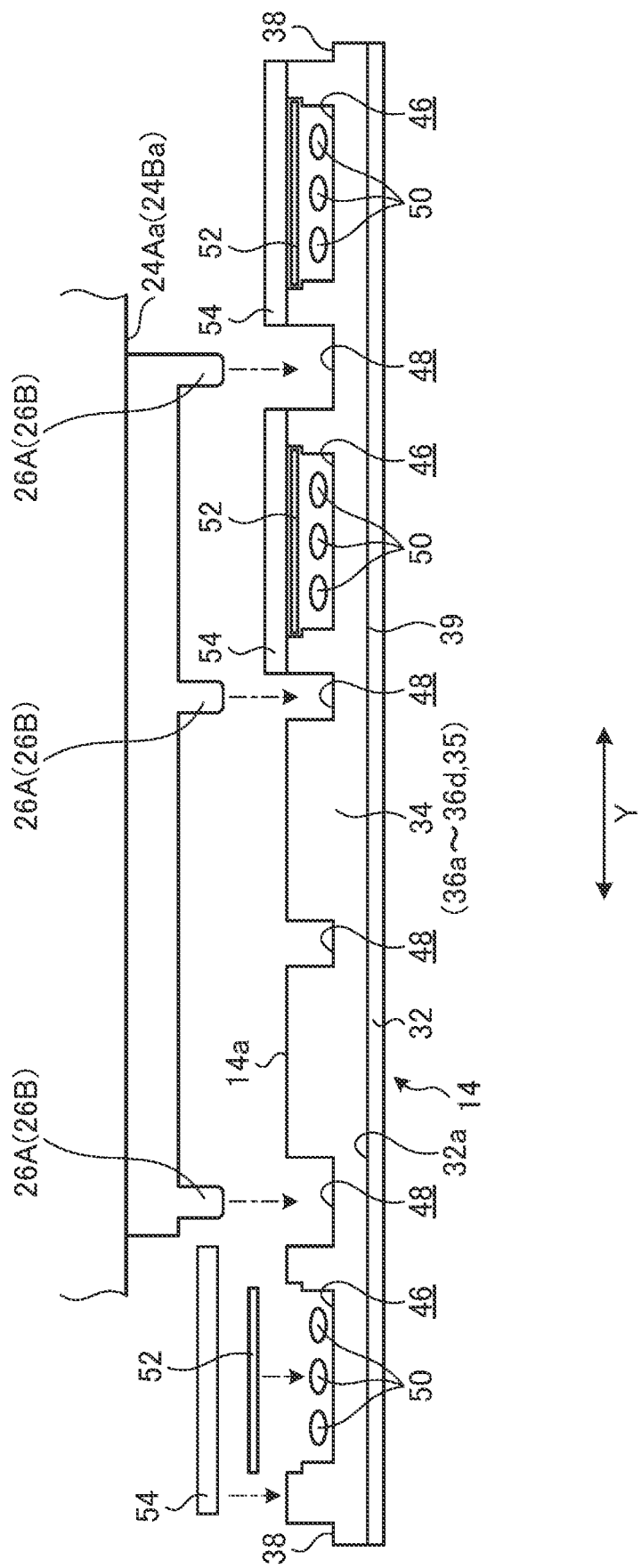
FIG. 6 is a schematic side view of the spine member.
Figure 7:
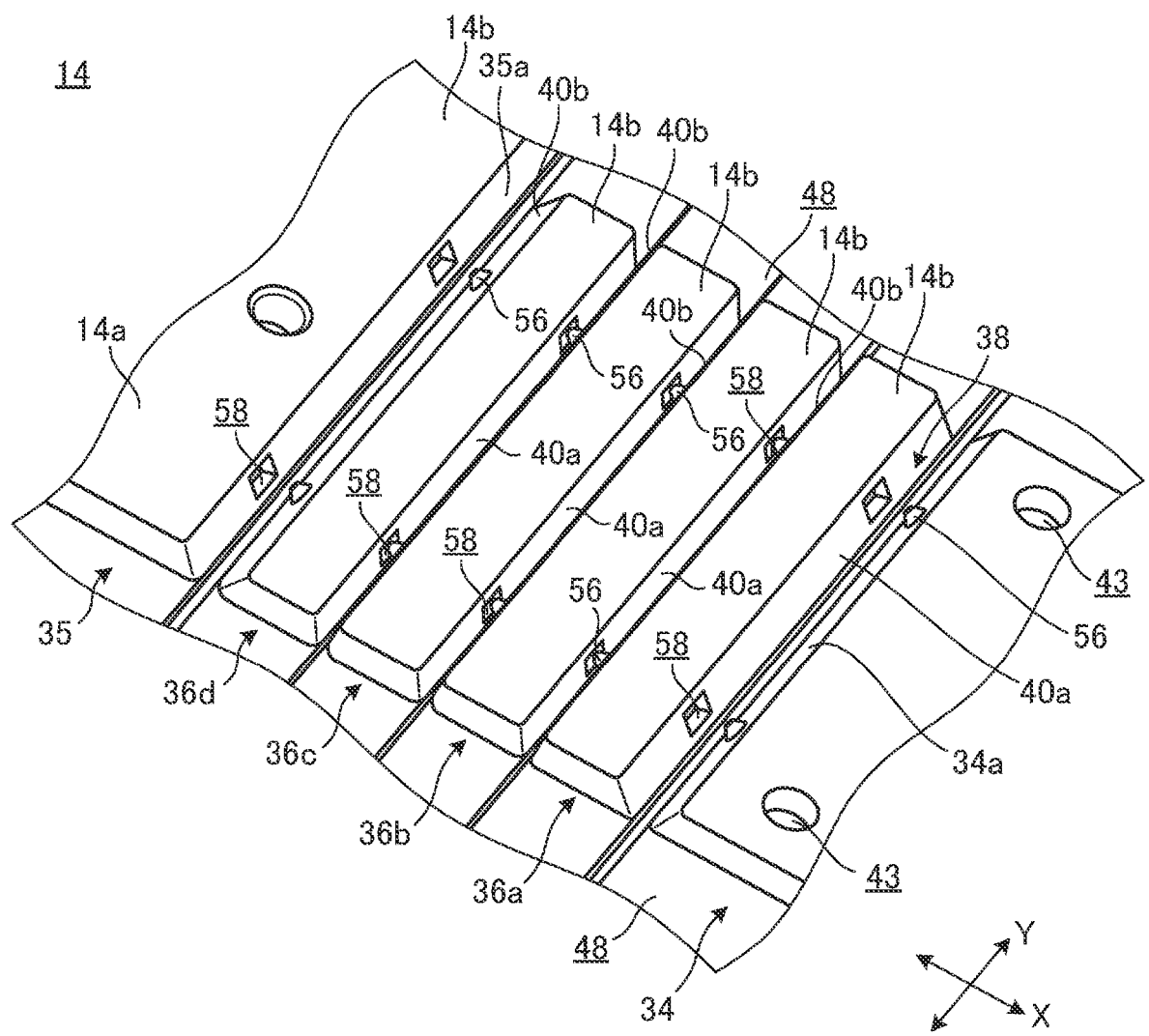
FIG. 7 is an enlarged perspective view illustrating a part of the spine member.

The spine member 14 is now described. FIG. 5 is a plan view of a spine member 14. FIG. 6 is a schematic side view of the spine member 14. FIG. 7 is an enlarged perspective view illustrating a part of the spine member 14.

As illustrated in FIGS. 4A and 4B, the spine member 14 covers a gap between the adjacent end portions 12Aa and 12Ba that is generated when the chassis 12A and 12B change from the flat form into the stacked form. The spine member 14 has a function of preventing components such as the display 16, the plates 24A and 24B, the motherboard 18, and the battery unit 22 housed in the chassis 12A and 12B from being exposed to an outside in the stacked form. The spine member 14 is placed in the gap generated between the adjacent end portions 12A and 12Ba in the stacked form and also serves as a post supporting the chassis 12A and 12B in the stacking direction. The spine member 14 is a thin plate member that is flexible in the X direction. The spine member 14 is provided across the inner surfaces 12Ab and 12Bb of the chassis 12A and 12B to bridge and cover the adjacent end portions 12Aa and 12Ba from an inside.

As illustrated in FIGS. 4A to 5, the spine member 14 includes a sheet member 32, a plurality of post members 34, 35, 36a, 36b, 36c, and 36d, and a misalignment preventing portion 38.

The sheet member 32 is a base sheet of the spine member 14. The sheet member 32 is a flexible, high-strength sheet member and has such a width dimension in the X direction that, in the stacked form, it can cover the gap between the adjacent end portions 12Aa and 12Ba of the chassis 12A and 12B (see FIG. 4B). The sheet member 32 is a triaxial woven fabric made of carbon fibers, glass fibers, or the like that have been triaxially woven together, for example. In particular, such a triaxial woven fabric is impregnated in a matrix resin to produce a triaxial woven prepreg. The sheet member 32 may alternatively be another fabric such as a biaxial fabric, a resin sheet, a metal sheet, or the like.

The post members 34, 35, and 36a to 36d are frame members constituting a skeleton of the spine member 14. Each of the post members 34, 35, and 36a to 36d is a thin and narrow strip-like plate formed of a resin, metal, or the like. In the spine member 14, the post members 34, 36a to 36d, and 35 are arranged side by side in this order from the first chassis 12A toward the second chassis 12B. In one or more embodiments, the outermost post members 34 and 35 are wider in the X direction than the post members 36a to 36d therebetween. The post members 34, 35, and 36a to 36d may all have same or different width dimensions in the X direction as appropriate.

The post members 34, 35, and 36a to 36d are provided to cover the front side of the sheet member 32 as a whole. Bottom sides 39 of the post members 34, 35, and 36a to 36d are adhered to be fixed to a front side 32a of the sheet member 32 using a gluing agent or an adhesive such as a double-sided tape. As the chassis 12A and 12B are rotated, the spine member 14 is bent between a flat shape (see FIG. 4A) and a substantial U-shape (see FIG. 4B). The post members 34, 35, and 36a to 36d and the sheet member 32 may be integrally molded by a resin. A thin plate portions 41 is provided at longitudinal end portions of the post members 34, 35, and 36a to 36d. The thin plate portion 41 is slidably held on a lower side of the hinge 17 (see FIG. 3).

The post member 34 arranged on a first chassis 12A side end has a trapezoidal cross section, and a leg thereof on the first chassis 12A side is orthogonal to upper and lower bases thereof. The post member 34 is placed on the inner surface 12Ab of the first chassis 12A and is slidable in the X direction relative to the inner surface 12Ab. A side surface 34a of the post member 34 on the second chassis 12B side faces a side surface 40a of the adjacent post member 36a. The side surface 34a is an inclined surface inclined in a direction from the second chassis 12B toward the first chassis 12A as it goes from the bottom side 39 toward the front side 14a of the post member 34 (see FIG. 4A). In other words, the side surface 34a is inclined in a direction away from the post member 36a as it goes upward.

The post member 34 is biased by a spring 42 in the X direction (see FIG. 3). The spring 42 continuously biases the spine member 14 in the X direction toward the first chassis 12A side via the post member 34.

The post member 35 arranged on a second chassis 12B side end has a trapezoidal cross section, and a leg thereof on the second chassis 12B side is orthogonal to upper and lower bases thereof. The post member 35 is placed on the inner surface 12Bb of the second chassis 12B and is fixed to be immovable relative to the inner surface 12Bb. The post member 35 is provided with an attachment hole 43 penetrating in a thickness direction at an appropriate longitudinal location (see FIG. 5). A screw 44 is inserted through the attachment hole 43. The screw 44 is screwed through the attachment hole 43 into an unillustrated female threaded portion provided on the inner surface 12Bb of the second chassis 12B. The post member 35, i.e., the spine member 14 is thus fixed to the second chassis 12B. A side surface 35a of the post member 35 on the first chassis 12A side faces a side surface 40b of the adjacent post member 36d. The side surface 35a is an inclined surface inclined in a direction from the first chassis 12A toward the second chassis 12B as it goes from the bottom side 39 toward the front side 14a of the post member 35 (see FIG. 4A). In other words, the side surface 35a is inclined in a direction away from the post member 36d as it goes upward.

Each of the post members 36a to 36d has a trapezoidal cross section. The post members 36a to 36d are placed on the inner surface 12Ab of the first chassis 12A and are slidable in the X direction relative to the inner surface 12Ab. Each of the post members 36a to 36d has a side surface 40a on the first chassis 12A side and a side surface 40b on the second chassis 12B side. The side surface 40a is an inclined surface inclined in a direction from the first chassis 12A toward the second chassis 12B as it goes from the bottom side 39 toward the front side 14a of each of the post members 36a to 36d. The side surface 40b is an inclined surface inclined in a direction from the second chassis 12B toward the first chassis 12A as it goes from the bottom side 39 toward the front side 14a of each of the post members 36a to 36d. Among the four post members 36a to 36d, the outermost post members 36a and 36d are shaped symmetrically to each other and the intermediate post members 36b and 36c are shaped symmetrically to each other. The number of the post members 36a to 36d to be provided can be changed as appropriate, and there may be five or more of them. It is, however, noted that the spine member 14 requires the outermost post members 34 and 35 and at least one or more intermediate post members 36a to 36d for smooth bending.

Thus, in the spine member 14, the post member 35 is fixed to the second chassis 12B, and the post member 34 and the post members 36a to 36d are supported to be movable in the X direction relative to the first chassis 12A. In the spine member 14, alternatively, the post member 35 may be fixed to the first chassis 12A and the post member 34 may be arranged on the second chassis 12B side.

As illustrated in FIGS. 5 to 7, a plurality of grooves 46 and a plurality of relief portions 48 are provided on the front side 14a of the spine member 14.

Three grooves 46 are provided in the longitudinal direction of the spine member 14, for example. Each groove 46 is formed by partially recessing the front side 14a of the spine member 14 and extends along the X direction like a canal. In other words, each groove 46 is formed by recessing a part of each post member 34, 35, and 36a to 36d at same locations in the Y direction on the front side 14a so that the grooves together form a continuous groove shape in the X direction. Each groove 46 serves as a passage for a cable 50 extending across the left and right chassis 12A and 12B (see FIGS. 3 and 6). Passing through the groove 46 prevents the cable 50 from being displaced or lifted on the front side 14a during the rotation of the chassis 12A and 12B. Accordingly, the cable 50 will not caught between other components or subjected to such an excessive force that causes a connection terminal thereof to come off during the rotation of the chassis 12A and 12B.

As illustrated in FIGS. 4A, 4B, and 6, a top opening of the groove 46 is covered by the cover member 52. The cover member 52 serves as a cap that covers the groove 46 to prevent the cable 50 from lifting and coming off more reliably. The cover member 52 is a flexible sheet. A second chassis 12B side end of the cover member 52 in the X direction is fixed to the front side 14a of the post member 35 using the screw 44, and a first chassis 12A side end is supported to be relatively slidable in the X direction on the front side 14a of the post member 34. The first chassis 12A side end of the cover member 52 is held to be slidable and moveable between the front side 14a of the post member 34 and a retaining member 54 fixed to the front side 14a. This allows the cover member 52 to be bent together with the spine member 14 on the front side 14a of the spine member 14 (see FIGS. 4A and 4B). FIG. 6 illustrates the leftmost one of the three cover members 52 as exploded.

Four relief portions 48 are provided in the longitudinal direction of the spine member 14, for example. Each relief portion 48 is formed by recessing the front side 14a in the same manner as the groove 46 but has a smaller width dimension in the Y direction than that of the groove 46. As illustrated in FIG. 6, the relief portions 48 serve to avoid that the locking claws 26A and 26B protruding beyond the adjacent end surfaces 24Aa and 24Ba of the plates 24A and 24B interfere with the front side 14a during the rotation of the chassis 12A and 12B. The relief portions 48 are therefore provided at positions corresponding to the locking claws 26A and 26B in the Y direction.

The misalignment preventing portion 38 is now described. The misalignment preventing portion 38 serves to maintain the rigidity of the spine member 14 in the stacked form. The misalignment preventing portion 38 is disposed each between the post members 34 and 36a, 36a and 36b, 36b and 36c, 36c and 36d, and 36d and 35 to suppress a misalignment between the post members due to a relative movement in the stacked form.

As illustrated in FIGS. 4A, 4B, and 7, the misalignment preventing portion 38 includes a protrusion 56 and a locking hole 58 that can be engaged with and disengaged from each other. Each post member 34, 35, and 36a to 36d has a raised portion 14b in a part where the groove 46 and the relief portion 48 are not provided. The raised portion 14b is thicker than a part where the groove 46 and the relief portion 48 are provided. The misalignment preventing portion 38 is provided by using the raised portion 14b of each post member 34, 35, and 36a to 36d. As illustrated in FIG. 5, in an example, the misalignment preventing portions 38 are provided on the outermost raised portions 14b in both Y-direction ends of the spine member 14 and on the raised portions 14b in the middle or vicinity thereof. The position and number of the misalignment preventing portion 38 to be provided can be changed as appropriate.

The protrusion 56 is provided on each side surface 34a and 40b facing the second chassis 12B side of the raised portions 14b of the post members 34, 35, and 36a to 36d. In other words, the protrusion 56 is projected from each side surface 34a and 40b of the post members 34 and 36a to 36d. The protrusion 56 is formed in a truncated cone shape and tapered from the side surface 34a or 40b toward a tip thereof. The protrusion 56 may be formed in a truncated pyramid shape, cylindrical shape, etc. Note that the protrusion 56 may be tapered like the truncated cone shape or the truncated pyramid shape. This allows manufacturing tolerance and rattling to be absorbed when the protrusion 56 is engaged with and disengaged from the locking hole 58. The same applies to a rib 60 described later.

The locking hole 58 is disposed to face the protrusion 56 so that the protrusion 56 can be engaged therewith and disengaged therefrom. The locking hole 58 is provided on each side surface 35a and 40a facing the first chassis 12A side of the raised portions 14b of the post members 34, 35, and 36a to 36d. In other words, the locking hole 58 is formed at a portion opposite to the protrusion 56 on each of the side surfaces 35a and 40a of the post members 35 and 36a to 36d and has such an inner diameter that the protrusion 56 can be inserted thereinto and removed therefrom. The locking hole 58 is a hole of a truncated pyramid shape whose inner diameter is reduced toward an interior thereof. The locking hole 58 may be formed in a truncated cone shape, cylindrical shape, etc. In consideration of manufacturing tolerance, rattling, and others of the post members 34, 35, and 36a to 36d, the locking hole 58 is formed to have an inner diameter that is somewhat larger than an outer diameter of the protrusion 56.

In the flat form, the protrusion 56 has been removed from the opposite locking hole 58 (see FIGS. 4A and 7). As the chassis 12A and 12B are rotated to change from the flat form to the stacked form, the protrusion 56 and the locking hole 58 gradually approach each other. Then, in the stacked form, the protrusion 56 is completely engaged with the locking hole 58 (see FIG. 4B). In the spine member 14, this engagement between the protrusion 56 and the locking hole 58 serves, in the stacked form, to suppress a relative movement each between the side surfaces 34a and 40a, 40b and 40a, and 40b and 35a abutting on each other.

Thus, when the portable information device 10 is subjected to an external force F to crush the gap between the chassis 12A and 12B in the stacked form as illustrated in FIG. 4B, misalignments among the successive post members 34, 35, and 36a to 36d forming an arch shape are suppressed. That is, the post members 34, 35, and 36a to 36d are prevented from relatively moving toward an inner or outer circumference side of the arch (see illustrated double headed arrows D), i.e., in directions perpendicular to surface directions of the side surfaces 34a, 35a, 40a, and 40b. This allows the successive post members 34, 35, and 36a to 36d of the spine member 14 to be engaged with each other and serve as a highly rigid post supporting the chassis 12A and 12B. As the spine member 14 serving as a strong post is thus stretched between the chassis 12A and 12B, the external force F crushing the gap between the chassis 12A and 12B can be received by the portable information device 10 in the stacked form as illustrated in FIG. 4B. This prevents, in the portable information device 10, the gap between the chassis 12A and 12B in the stacked form from being crushed as well as the display 16, other electronic components, or the like housed therein from being subjected to a load and resulting in a failure. Note that the post members 34, 35, and 36a to 36d may not form the curved arch shape in the stacked form. For example, the outermost post members 34 and 35 and the post members 36a and 36d adjacent thereto may be arranged to form two right angle corners and the post members 36a to 36d may be arranged on a straight line in the stacking direction of the chassis 12A and 12B so that a recessed shape or the like is formed.

Figure 8:
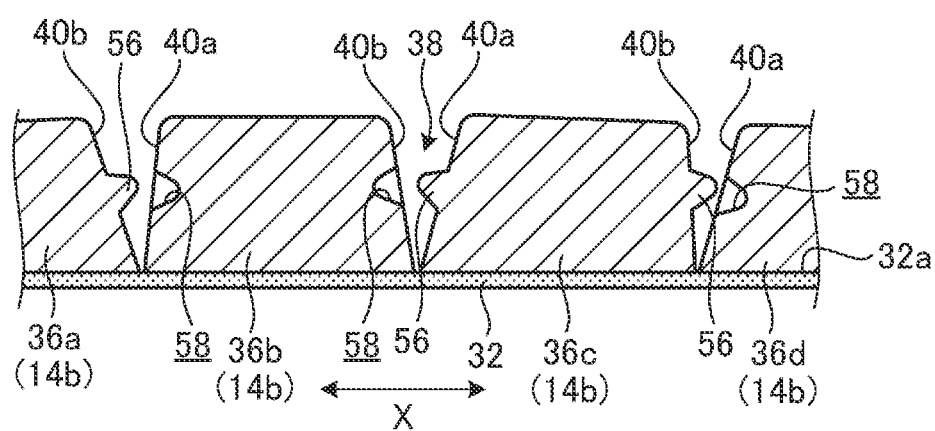
FIG. 8 is an enlarged side cross-sectional view schematically illustrating a part of the spine member that includes a first modified version of a misalignment preventing portion.

As long as the protrusion 56 and the locking hole 58 are disposed to face each other in an engageable/disengageable manner, they may be provided on any of the side surfaces 34a, 35a, 40a, and 40b. Although one or two protrusion(s) 56 and locking hole(s) 58 are provided on each side surface 34a, 35a, 40a, or 40b in the configuration example illustrated in FIG. 7, there may be provided three or more protrusions 56 and locking holes 58. As illustrated in FIG. 8, the misalignment preventing portion 38 may be configured by one raised portion 14b (see the illustrated post member 36c) having the protrusions 56 on the respective side surfaces 40a and 40b and one raised portion 14b adjacent thereto (see the illustrated post member 36b) having the locking holes 58 on the respective side surfaces 40a and 40b.

Figure 9:
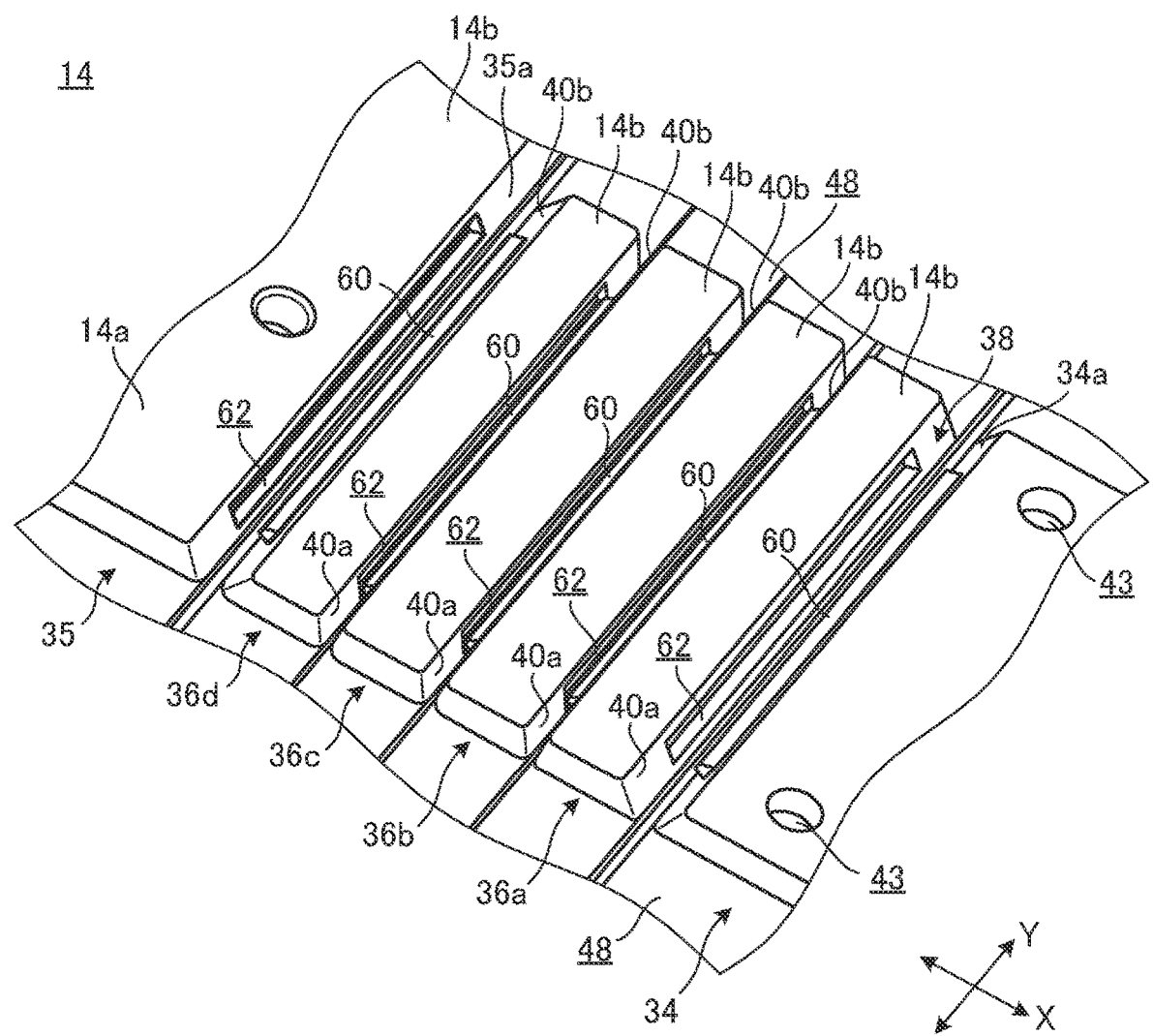
FIG. 9 is an enlarged perspective view illustrating a part of the spine member that includes a second modified version of the misalignment preventing portion.

As illustrated in FIG. 9, the misalignment preventing portion 38 may be configured using a rib 60 and a locking hole 62 instead of the protrusion 56 and the locking hole 58. The rib 60 is a long, plate-like projection extending on each of the side surface 34a and others in a longitudinal direction thereof. A cross section of the rib 60 in a plane orthogonal to the longitudinal direction is, similarly to the projection 56, not particularly limited. It may be a rectangular shape, a trapezoidal shape, a dome shape, a triangle shape, etc. The locking hole 62 is so shaped that the rib 60 can be engaged therewith and disengaged therefrom and extends, like the rib 60, on each of the side surface 40a and others in the longitudinal direction thereof.

Figure 10:
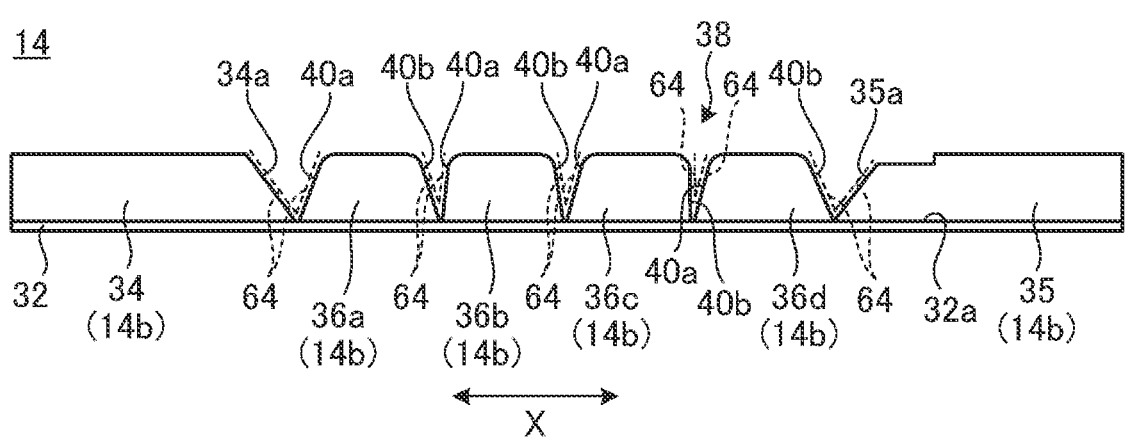
FIG. 10 is a side cross-sectional view schematically illustrating the spine member that includes another modified version of the misalignment preventing portion provided with a friction resistance imparting portion.

As illustrated in FIG. 10, the misalignment preventing portion 38 may be configured using a friction resistance imparting portion 64 instead of the protrusion 56 and the locking hole 58. The friction resistance imparting portion 64 suppresses the relative movement by increasing friction resistance (sliding resistance) each between the side surfaces 34*a* and 40*a*, 40*b* and 40*a*, and 40*b* and 35*a* when they abut on each other in the stacked form, for example. The friction resistance imparting portion 64 may increase the friction resistance by applying surface treatment to each of the side surface 34*a* and others, for example. The friction resistance imparting portion 64 may increase the friction resistance by attaching a sheet or the like made of a material having high friction resistance such as rubber onto each of the side surface 34*a* and others. The friction resistance imparting portion 64 may be provided one of the side surfaces 34*a* and 40*a*, one of the side surfaces 40*b* and 40*a*, and one of the side surfaces 40*b* and 35*a* facing each other.

The misalignment preventing portion 38 may either be configured by the protrusion 56 and the locking hole 58, by the rib 60 and the locking hole 62, or by the friction resistance imparting portion 64, or it may be configured by combining two or more of them. For example, the misalignment preventing portion 38 may include the protrusion 56 provided on one side surface 34*a* and the friction resistance imparting portion 64 provided around the protrusion 56. The spine member 14 may be provided with three misalignment preventing portions 38 in the longitudinal direction thereof, such as, one configured by the protrusion 56 and the locking hole 58, another one configured by the rib 60 and the locking hole 62, and another one configured by the friction resistance imparting portion 64.

Figure 11A:
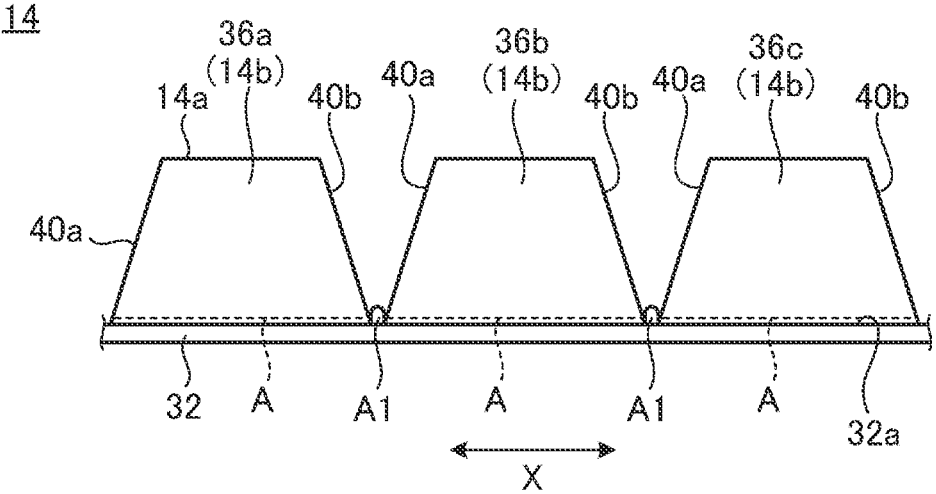
FIG. 11A is an enlarged side view schematically illustrating a part of the spine member in the flat form with a foreign body interposed between post members.
Figure 11B:
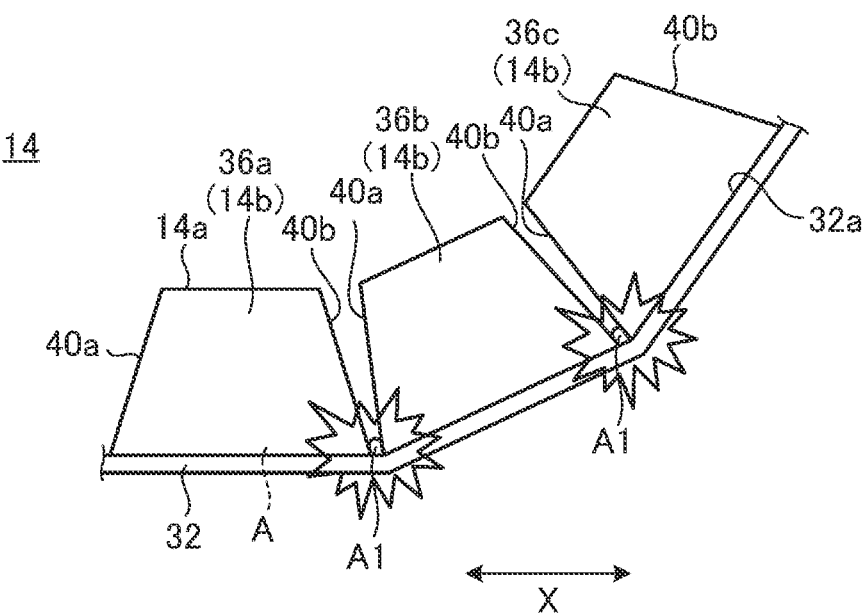
FIG. 11B is a side view illustrating that the spine member shown in FIG. 11A is bent.

As mentioned above, the post members 34, 35, and 36*a* to 36*d* are fixed to a front side 32*a* of the sheet member 32 using a gluing agent A, for example. As the chassis 12A and 12B are rotated, the post members 34, 35, and 36*a* to 36*d* of the spine member 14 move relatively. If the gluing agent A is hardened while it is forced out from the bottom side 39 of each of the post member 34 and others as illustrated in FIG. 11A, a foreign body A1 or the hardened gluing agent A ends up being interposed between the facing side surfaces such as 40*b* and 40*a*. When the spine member 14 is then bent as illustrated in FIG. 11B, the side surfaces such as 40*b* and 40*a* gradually approach each other to sandwich the foreign body A1 therebetween, which can hinder the spine member 14 from forming the designed arch form as illustrated in FIG. 4B. This may result in that an excessive load is applied to the spine member 14 to eventually break the spine member 14 and the chassis 12A and 12B or make it impossible for the chassis 12A and 12B to be closed to a desired angle.

Figure 12A:
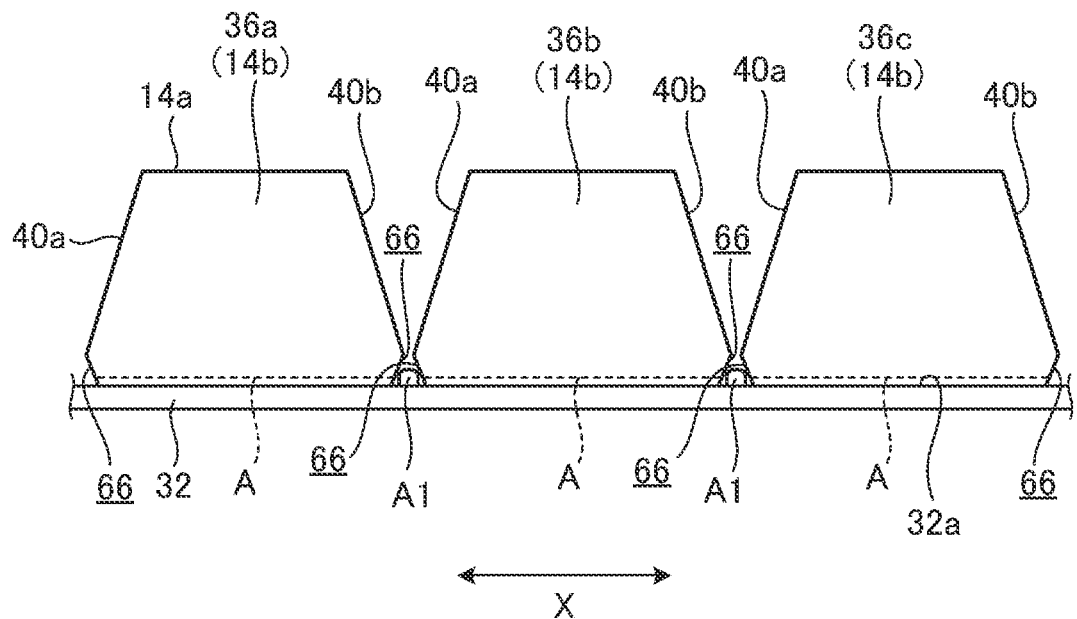
FIG. 12A is an enlarged side view schematically illustrating a part of the spine member including a cut portion in the flat form with a foreign body interposed between the post members.
Figure 12B:
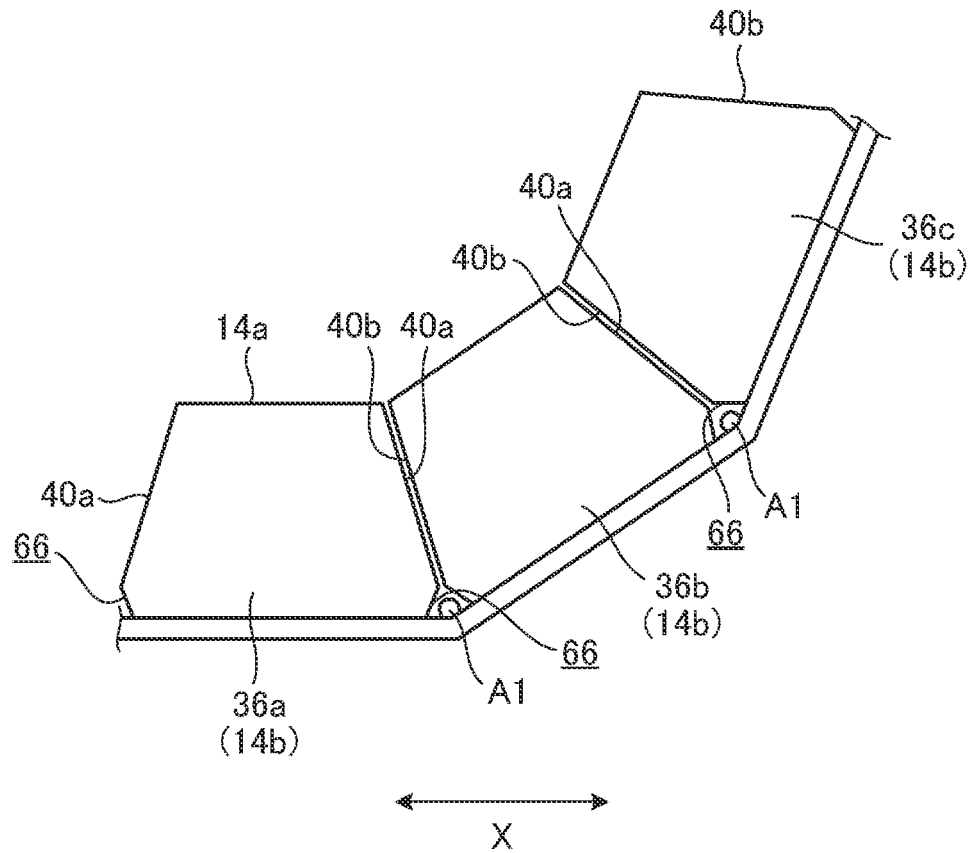
FIG. 12B is a side view illustrating that the spine member shown in FIG. 12A is bent.

In view of this, the spine member 14 may be so structured that it can be bent to form the desired arch shape even if the foreign body A1 is generated. Specifically, the spine member 14 may include, as illustrated in FIGS. 12A and 12B, cut portions 66 on the side surfaces 34*a*, 35*a*, 40*a*, and 40*b* of the post members 34, 35, and 36*a* to 36*d*. Note that FIGS. 12A and 12B representatively illustrate the post members 36*a* to 36*c*, and the side surfaces 34*a*, 35*a*, 40*a*, and 40*b* of the other spine members 34, 35, and 36*d* may be configured in the same manner. The cut portions 66 are respectively provided at corners between the side surface 40*a* and others and surfaces to be adhered to the sheet member 32 (bottom sides 39). The cut portions 66 may each be formed as a beveled shape, an R shape, or the like.

The cut portions 66 like this of the post member 34 and others allow the spine member 14 to keep clear of the foreign body A1 when it is bent as illustrated in FIG. 12B. The spine member 14 can thus be appropriately bent even if the foreign body A1 is generated. Note that the post members 34, 35, and 36*a* to 36*d* of the spine member 14 may be formed of a transparent or translucent material. The gluing agent A forced out from the bottom sides 39 may then be easily recognized visually, which allows the generation of the foreign body A1 itself in the spine member 14 to be reduced.

Providing both the cut portion 66 and the misalignment preventing portion 38 described above contributes to ensuring a smoother bending and rigidity in the stacked form of the spine member 14. It is needless to say that the cut portion 66 may be effectively applied to the spine member 14 without any misalignment preventing portion 38.

Thus, the portable information device 10 according to one or more embodiments includes a spine member 14 that covers a gap generated between the adjacent end portions 12Aa and 12Ba of the chassis 12A and 12B. The spine member 14 includes the misalignment preventing portion 38 that suppresses the relative movements among the post members 34, 35, and 36*a* to 36*d*.

As the gap between the chassis 12A and 12B is covered by the spine member 14 in the stacked form, deterioration in appearance quality of the portable information device 10 is prevented. In the portable information device 10, the spine member 14 also functions as a post between the adjacent end portions 12Aa and 12Ba of the chassis 12A and 12B in the stacked form. The misalignment preventing portion 38 then suppresses the relative movement each between the side surfaces 34*a* and 40*a* and others abutting on each other so that the spine member 14 as a whole serves as a post whose high rigidity is maintained. This prevents, in the portable information device 10, the gap between the chassis 12A and 12B in the stacked form from being crushed as well as the electronic components or the like housed therein from resulting in a failure. In particular, the portable information device 10 of one or more embodiments includes the display 16 with the bending region R, and the bending region R is arranged on the adjacent end portions 12Aa and 12Ba side in the stacked form. As such, if the gap between the chassis 12A and 12B is crushed, the bending region R of the display 16 forming the U-shaped curve may be crushed, broken, and thus damaged. In the portable information device 10, however, the spine member 14 functions as a strong post in the stacked form to protect the bending region R of the display 16.

In the flat form, the side surfaces 34*a*, 40*a*, and others facing each other of the post members 34, 35, and 36*a* to 36*d* of the spine member 14 are separated from each other or abut on each other in smaller areas than those in the stacked form (see FIG. 4A). In the stacked form, on the other hand, the side surfaces 34*a*, 40*a*, and others facing each other of the post members 34, 35, and 36*a* to 36*d* abut on each other with the substantially entire surfaces. This ensures the smooth bending of the spine member 14 between the flat form and the stacked form and allows the misalignment preventing portion 38 to surely exhibit its function in the stacked form.

The misalignment preventing portion 38 may be provided between each of the facing side surfaces 34*a* and 40*a*, 40*b* and 40*a*, and 40*b* and 35*a*. Depending on the structure of the spine member 14, however, it may be partially provided such as only between the facing side surfaces 34*a* and 40*a*, in which case it may still exhibit sufficient effect.

The present invention is not limited to the foregoing embodiments, and modifications can be freely made without departing from the scope of the present invention.

In the description above, the display 16 has been exemplarily shown as a flexible display with the bending region R. However, it is also possible that top surfaces of the chassis 12A and 12B are respectively provided with displays (dual displays).

Description has been made in the above of the portable information device 10 that is foldable into a double-folded state like a folio. Note that the portable information device of one or more embodiments of the present invention may be configured not only with two chassis of the same shape connected to each other in a foldable manner, but also with: a larger chassis and two smaller chassis foldably coupled to the left and right edge portions of the larger chassis like double doors; one chassis to each of left and right sides thereof a chassis is coupled, wherein the left and right chassis have different folding directions so that the three chassis form an S-shape; a larger chassis and a smaller chassis foldably connected to either one of left and right edge portions of the larger chassis to form a J-shape, for example. Four or more chassis may be coupled to each other.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

DESCRIPTION OF SYMBOLS

10 Portable information device
12A First chassis
12B Second chassis
14 Spine member
16 Display
24A First plate
24B Second plate
26A, 26B Locking claw
32 Sheet member
34, 35, 36a-36d Post member
34a, 35a, 40a, 40b Side surface
38 Misalignment preventing portion
46 Groove
48 Relief portion
56 Protrusion
58, 62 Locking hole
60 Rib
64 Friction resistance imparting portion
66 Cut portion

What is claimed is:

1. A portable information device comprising: a first chassis; a second chassis disposed adjacently to the first chassis and coupled to the first chassis to be rotatable between a flat form and a stacked form, wherein: in the flat form, the first and second chassis are side by side in a direction perpendicular to a surface direction of the first and second chassis, and in the stacked form, the first and second chassis are stacked and overlap one another in the surface direction; and a spine member disposed across adjacent end portions of the first and second chassis, wherein the spine member covers a gap generated between the adjacent end portions of the first and second chassis in the stacked form, the spine member comprises: adjacent post members disposed such that facing side surfaces of the post members are relatively rotatable, wherein three or more of the post members are disposed along a direction in which the first and second chassis are disposed side by side; a misalignment preventing portion disposed between the facing side surfaces, wherein the misalignment preventing portion suppresses a relative movement between the facing side surfaces when the facing side surfaces abut one another, and in the stacked form, the facing side surfaces abut one another via the misalignment preventing portion and the post members are successively disposed between the first and second chassis to cover the gap; and a flexible sheet member, bottom sides of the post members are fixed to a front side of the flexible sheet member using a gluing agent, and the post members have a cut portion, at a corner between the facing side surfaces and the bottom sides, that forms a cavity defined by the facing side surfaces and the front side in the flat form and in the stacked form; and wherein the cavity accommodates the gluing agent forced out from the bottom sides.

2. A portable information device comprising:
a first chassis;
a second chassis disposed adjacently to the first chassis and coupled to the first chassis to be rotatable between a flat form and a stacked form, wherein:
in the flat form, the first and second chassis are side by side in a direction perpendicular to a surface direction of the first and second chassis, and
in the stacked form, the first and second chassis are stacked and overlap one another in the surface direction; and
a spine member disposed across adjacent end portions of the first and second chassis, wherein
the spine member covers a gap generated between the adjacent end portions of the first and second chassis in the stacked form,
the spine member comprises post members disposed along a direction in which the first and second chassis are disposed side by side, and
the portable information device further comprises:
a display that extends across the first and second chassis and that comprises a bending region at least in an area across the adjacent end portions;
a first plate disposed on an inner surface of the first chassis, wherein the first plate supports an area of the display on a side of the first chassis;
a second plate disposed on an inner surface of the second chassis and adjacent to the first plate, wherein the second plate supports an area of the display on a side of the second chassis; and
a locking piece that protrudes from one or both of a backside of the first plate and a backside of the second plate toward the other or both of the first plate and the second plate to contact a backside thereof, wherein
a distal end of the locking piece protrudes beyond adjacent end surfaces of the first plate and the second plate,
the first plate and the second plate are disposed side by side in a direction perpendicular to a surface direction of the first plate and the second plate in the flat form,
the spine member further comprises a relief portion formed by recessing front sides of the post members, and
the relief portion is disposed at a position corresponding to the locking piece.

3. The portable information device according to claim 1, wherein the misalignment preventing portion comprises:
a protrusion on one of the facing side surfaces; and
a locking hole on the other of the facing side surfaces, wherein
the protrusion engages with the locking hole.

4. The portable information device according to claim 3, wherein the protrusion is a truncated cone shape protrusion or a truncated pyramid shape protrusion.

5. The portable information device according to claim 1, wherein the misalignment preventing portion comprises a friction resistance imparting portion on one or both of the facing side surfaces, and the friction resistance imparting portion increases sliding resistance between the facing side surfaces.

6. The portable information device according to claim 1, wherein the misalignment preventing portion is disposed between each of the facing side surfaces.

7. The portable information device according to claim 1, wherein, in the flat form, the facing side surfaces are separated from one another or abut one another in smaller areas than in the stacked form.

8. A portable information device comprising: a first chassis; a second chassis disposed adjacently to the first chassis and coupled to the first chassis to be rotatable between a flat form and a stacked form, wherein: in the flat form, the first and second chassis are side by side in a direction perpendicular to a surface direction of the first and second chassis, and in the stacked form, the first and second chassis are stacked and overlap one another in the surface direction; and a spine member disposed across adjacent end portions of the first and second chassis, wherein the spine member covers a gap generated between the adjacent end portions of the first and second chassis in the stacked form, and the spine member comprises: adjacent post members disposed such that facing side surfaces of the post members are relatively rotatable, wherein three or more of the post members are disposed along a direction in which the first and second chassis are disposed side by side; and a flexible sheet member, wherein bottom sides of the post members are fixed to a front side of the flexible sheet member using a gluing agent, in the stacked form, the facing side surfaces abut one another and the post members are successively disposed between the first and second chassis to cover the gap, and the post members have a cut portion, at a corner between the facing side surfaces and the bottom sides, that forms a cavity defined by the facing side surfaces and the front side in the flat form and in the stacked form; and wherein the cavity accommodates the gluing agent forced out from the bottom sides.

* * * * *